(12) United States Patent
Hayashi et al.

(10) Patent No.: US 8,125,583 B2
(45) Date of Patent: Feb. 28, 2012

(54) STEREOSCOPIC IMAGE DISPLAY APPARATUS

(75) Inventors: Akinori Hayashi, Hakusan (JP); Hiroshi Ito, Hakusan (JP); Shinichi Honda, Hakusan (JP)

(73) Assignee: Eizo Nanao Corporation, Ishikawa (JP)

( * ) Notice: Subject to any disclaimer, the term of this patent is extended or adjusted under 35 U.S.C. 154(b) by 0 days.

(21) Appl. No.: 12/989,584

(22) PCT Filed: Mar. 5, 2010

(86) PCT No.: PCT/JP2010/001560
§ 371 (c)(1),
(2), (4) Date: Oct. 25, 2010

(87) PCT Pub. No.: WO2011/033694
PCT Pub. Date: Mar. 24, 2011

(65) Prior Publication Data
US 2011/0199547 A1 Aug. 18, 2011

(30) Foreign Application Priority Data

Sep. 16, 2009 (JP) ................................. 2009-214507
Dec. 18, 2009 (JP) ................................. 2009-287381

(51) Int. Cl.
*G02F 1/1335* (2006.01)
(52) U.S. Cl. ............................... 349/15; 353/7; 359/462
(58) Field of Classification Search .................. None
See application file for complete search history.

(56) References Cited

U.S. PATENT DOCUMENTS
2008/0297434 A1* 12/2008 Abileah .......................... 345/5

FOREIGN PATENT DOCUMENTS

| JP | 2000-338449 A | 12/2000 |
|---|---|---|
| JP | 2003-5130 A | 1/2003 |
| JP | 2008-521064 A | 6/2008 |
| JP | 2008-191399 A | 8/2008 |
| WO | WO-2006/058094 A2 | 6/2006 |

OTHER PUBLICATIONS

International Search Report for the Application No. PCT/JP2010/001560 mailed Apr. 13, 2010.

* cited by examiner

*Primary Examiner* — Thanh-Nhan Nguyen
(74) *Attorney, Agent, or Firm* — Cheng Law Group, PLLC

(57) ABSTRACT

A stereoscopic image display apparatus of this invention includes a half mirror having a ½ wavelength plate and a half mirror layer. Therefore, a direction of polarization of light incident on a surface of a transmission side of the half mirror can be rotated and emitted. This can be manufactured at lower manufacturing cost than a construction having the ½ wavelength plate on the front display plane of one of the two image display devices with linear polarization plates having the same polarizing direction, or preparing two image display devices with linear polarization plates having different polarizing directions. A high-quality stereoscopic image can be observed by adjusting the orders and positions of sub-pixel colors of the two image display devices at the time of composition and display through the half mirror.

20 Claims, 8 Drawing Sheets (a)

(b)

(c)

(a)

(b)

(c)

STEREOSCOPIC IMAGE DISPLAY APPARATUS

TECHNICAL FIELD

This invention relates to a stereoscopic image display apparatus for enabling recognition of a stereoscopic image based on an image for the right eye and an image for the left eye, and more particularly to a technique of providing stereoscopic viewing through a half mirror.

BACKGROUND ART

Conventionally, this type of apparatus includes the following stereoscopic image display apparatus (see Patent Document 1, for example). As shown in FIG. 9, the stereoscopic image display apparatus includes two image display devices 102, 103, respectively serving to display an image for the left eye and an image for the right eye, and having a linear polarization plate with a horizontal polarizing direction. Further, a half mirror 105 is disposed in a slant position to extend from a corner formed between the two image display devices 102, 103 to an area between the two image display devices 102, 103. And a ½ wavelength plate 119 and a linear polarization plate 121 with a vertical polarizing direction are laminated in order on the front plane of a linear polarization plate 113 on the front plane of a display surface of the image display device 102.

According to this conventional apparatus, the light of an image displayed on the image display device 102 is emitted as once polarized horizontally by the linear polarization plate 113 with the horizontal polarizing direction. The light of the image has its direction of polarization rotated 90 degrees to change from the horizontal direction to the vertical direction by the ½ wavelength plate 119 and linear polarization plate 121 further arranged on the front plane of the linear polarization plate 113, and is reflected by the half mirror 105, whereupon the vertically polarized light of the image travels toward the observer. On the other hand, the light of the image displayed on the image display device 103 is emitted as horizontally polarized, and passes through the half mirror 105. The horizontally polarized light of the image travels as it is toward the observer. Of the lights of the images displayed on the two image display devices 102, 103 which are transmitted through and reflected by the half mirror 105 have different directions of polarization, i.e. one being vertical and the other being horizontal. Therefore, the observer sees with the right and left eye through glasses 129 with polarization plates which are linear polarization plates 129R and 129L with vertical and horizontal directions of polarization, respectively, thereby seeing parallax images distributed to the right and left eyes. Therefore, the observer can observe a stereoscopic image.

In a conventional apparatus, as shown in FIG. 10, when upper positions of images to be displayed are set to upper positions of image display devices 202, 203, the image display device 203 is usually disposed so that the upper position of the image display device 203 and the upper position of the image display device 202 are opposed to each other. And the image is displayed on the image display device 203 after a horizontal reversal, whereby the image displayed as reflected by a half mirror 205 can have vertical and horizontal directions matched with those of the image of the image display device 202 displayed as transmitted through the half mirror 205.

Patent Document 1

Unexamined Patent Publication No. 2008-191399

DISCLOSURE OF THE INVENTION

Problem to be Solved by the Invention

However, the conventional examples with such constructions have the following drawbacks. In the case of the conventional apparatus as shown in FIG. 9, with the ½ wavelength plate 119 and linear polarization plate 121 provided on the front plane of one image display device 102, one of the horizontally polarized lights of the images from the two image display devices 102, 103 becomes polarized in the different direction. However, when the sheet-like ½ wavelength plate 119 and linear polarization plate 121 are attached to a module such as a liquid crystal display panel, for example, the attachment operation may require a different jig for each modular size. Thus, there arises a problem of high cost when size development or the like is taken into consideration. Further, in order to obtain lights of images polarized in different, vertical and horizontal directions, it is conceivable to manufacture liquid crystal display panels having linear polarization plates with a different polarizing direction (e.g. the longitudinal direction as opposed to the vertical direction). This will result in high cost depending on the quantity of manufacture. Even if an order is placed with other panel makers, they may decline such request.

In the case of the conventional apparatus as shown in FIG. 10, the two image display devices 202, 203 are arranged with the upper positions thereof opposed to each other. Usually such arrangement is made because it facilitates control when displaying images. When observing an image composed by being transmitted through and reflected by the half mirror 205, the two images displayed on the two image display devices are images with the same vertical and horizontal directions. However, when seen at sub-pixel level, as shown in FIG. 10, the RGB colors are arranged in converse orders. Therefore, when the observer looks at the two images composed by the half mirror 205, the resulting stereoscopic image can give an unpleasant sensation to the observer, for example, with flickering caused by the RGB colors arranged in converse orders. This is considered to be a cause of lowering the quality of stereoscopic images.

This invention has been made having regard to the state of the art noted above, and its object is to provide a stereoscopic image display apparatus for enabling observation of high-quality stereoscopic images while holding down manufacturing cost.

Means for Solving the Problem

To fulfill the above object, this invention provides the following construction.

A stereoscopic image display apparatus comprises a first image display device including a first display unit for displaying a first image which is either one of an image for the left eye and an image for the right eye, and a first linear polarization plate disposed on a front plane of the first display unit and having either one of vertical and horizontal polarizing directions; a second image display device disposed in a position for forming an angle with the first image display device, and including a second display unit for displaying a second image different from the first image, which is either one of the image for the left eye and the image for the right eye, and a second linear polarization plate disposed on a front plane of the second display unit and having the same polarizing direction as the first linear polarization plate; and a half mirror extending from a corner of the first image display device and the second image display device to an area between the first image display device and the second image display device, having functions to transmit light of the first image displayed on the first image display device and to reflect light of the second image displayed on the second image display device, and including, as arranged in order from an incidence side of a plane for transmitting the light of the first image, a polarized light rotating layer for rotating a direction of polarization of the light having undergone linear polarization, and a half mirror layer.

In the stereoscopic image display apparatus according to this invention, the half mirror has a polarized light rotating layer for rotating a direction of polarization of the light having undergone linear polarization, and a half mirror layer. Therefore, the light of the first image displayed on the first display unit of the first image display device and emitted as linearly polarized by the first linear polarization plate, can have the direction of polarization of the light rotated by being transmitted through the half mirror. Thus, one of the lights of the images emitted as linearly polarized in the same direction from the first image display device and second image display device can have the direction of polarization of the light changed. As a result, the observer can see, through glasses with polarization plates, the images displayed on the first image display device and second image display device, with the image for the left eye and the image for the right eye having a parallax difference, as distributed to the right and left eyes, thereby to be able to observe a stereoscopic image.

The half mirror has the polarized light rotating layer for rotating a direction of polarization of the light having undergone linear polarization, and the half mirror layer. This can be manufactured more easily and at lower manufacturing cost than a construction having the polarized light rotating layer on the front display plane of one of the two image display devices with linear polarization plates having the same polarizing direction, or manufacturing two image display devices with linear polarization plates having different polarizing directions.

In the stereoscopic image display apparatus according to this invention, it is preferred that the half mirror has a linear polarization layer provided between the polarized light rotating layer and the half mirror layer for adjusting the direction of polarization of the light of the image having passed through the polarized light rotating layer. With this construction, the linear polarization layer can adjust the direction of polarization of the light of the image having passed through the polarized light rotating layer to have the direction of polarization rotated. This can prevent rainbow patterns and variations in display color due to a wavelength dispersion of light.

In the stereoscopic image display apparatus according to this invention, it is preferred that the half mirror is formed such that the polarized light rotating layer has a slow axis inclined 45 degrees to a polarizing direction of the linear polarization layer, and arranged such that the polarizing direction of the linear polarization layer extends perpendicular to the polarizing direction of the first linear polarization plate. With this construction, the light of the image displayed on the display unit of the first image display device and emitted as linearly polarized by the first linear polarization disposed on the front plane of the display unit can have the direction of polarization rotated 90 degrees by the polarized light rotating layer, and the rotated light of the image can be adjusted by and emitted from the linear polarization layer. That is, by being transmitted through the half mirror, the linearly polarized light of the image can be emitted as rotated 90 degrees.

In the stereoscopic image display apparatus according to this invention, it is preferred that the half mirror has a half mirror mounting mechanism which can be attached in whichever of a vertical posture or a horizontal posture. When a change is made in the polarizing direction of the linear polarization plates arranged on the front planes of the display units of the first image display device and second image display device, e.g. when the polarizing direction is changed from vertical to horizontal, the half mirror can be rotated and attached in the vertical direction or horizontal direction to enable observation of a stereoscopic image.

In the stereoscopic image display apparatus according to this invention, it is preferred that the half mirror is square. This can eliminates a feeling of strangeness due to a size difference between vertical and horizontal when the half mirror is attached in the vertical direction and the horizontal direction, and can present images in the same area vertically and horizontally.

In the stereoscopic image display apparatus according to this invention, it is preferred that the first image display device and the second image display device are arranged such that, when the first image and the second image displayed are transmitted through or reflected by the half mirror to be composed, an order and positions of colors of sub-pixels are the same. The image composed of the images displayed on the first image display device and second image display device, respectively, and transmitted through or reflected by the half mirror, has the colors of RGB sub-pixels arranged in the same order and positions. This causes display states of the images for the left eye and right eye of the observer to be in agreement, thereby enabling observation of a stereoscopic image of improved quality.

The stereoscopic image display apparatus according to this invention, preferably, comprises a vertical image reversing unit for carrying out a process for vertically reversing the image displayed on the second image display device. This allows the images properly adjusted with respect to the four directions to be shown to the observer when the images displayed on the first image display device and second image display device, respectively, are composed at the half mirror.

In the stereoscopic image display apparatus according to this invention, it is preferred that the half mirror layer is arranged to have a transmittance and a reflectance based on a transmittance and a reflectance of the half mirror layer determined so that either one of a transmittance when light is transmitted through the polarized light rotating layer and the half mirror layer and a transmittance when light is transmitted through the polarized light rotating layer, the linear polarization layer and the half mirror layer be equal to the reflectance of the half mirror layer. Consequently, a difference between transmittance (transmitted light) and reflectance (reflected light) for each wavelength of the half mirror can be made small. Therefore, when the observer observes the images displayed on the first image display device and second image display device through the half mirror, the color difference between the images can be made small. Therefore, the stress of the observer at the time of stereoscopic viewing can be lightened. The observer can also observe a high-quality stereoscopic image.

Effects of the Invention

In the stereoscopic image display apparatus according to this invention, the half mirror has a polarized light rotating layer for rotating a direction of polarization of the light having undergone linear polarization, and a half mirror layer. Therefore, the light of the first image displayed on the first display unit of the first image display device and emitted as linearly polarized by the first linear polarization plate, can have the direction of polarization of the light rotated by being transmitted through the half mirror. Thus, one of the lights of the images emitted as linearly polarized in the same direction from the first image display device and second image display device can have the direction of polarization of the light of the image changed. As a result, the observer can see, through glasses with polarization plates, the images displayed on the first image display device and second image display device, with the image for the left eye and the image for the right eye having a parallax difference, as distributed to the right and left eyes, thereby to be able to observe a stereoscopic image.

The half mirror has the polarized light rotating layer for rotating a direction of polarization of the light having undergone linear polarization, and the half mirror layer. This can be manufactured more easily and at lower manufacturing cost than a construction having the polarized light rotating layer on the front display plane of one of the two image display devices with linear polarization plates having the same polarizing direction, or manufacturing two image display devices with linear polarization plates having different polarizing directions.

The image composed of the images displayed on the first image display device and second image display device, respectively, and transmitted through or reflected by the half mirror, has the colors of RGB sub-pixels arranged in the same order and positions. This causes display states of the images for the left eye and right eye of the observer to be in agreement, thereby enabling observation of a stereoscopic image of improved quality.

DESCRIPTION OF REFERENCES

Figure 1:
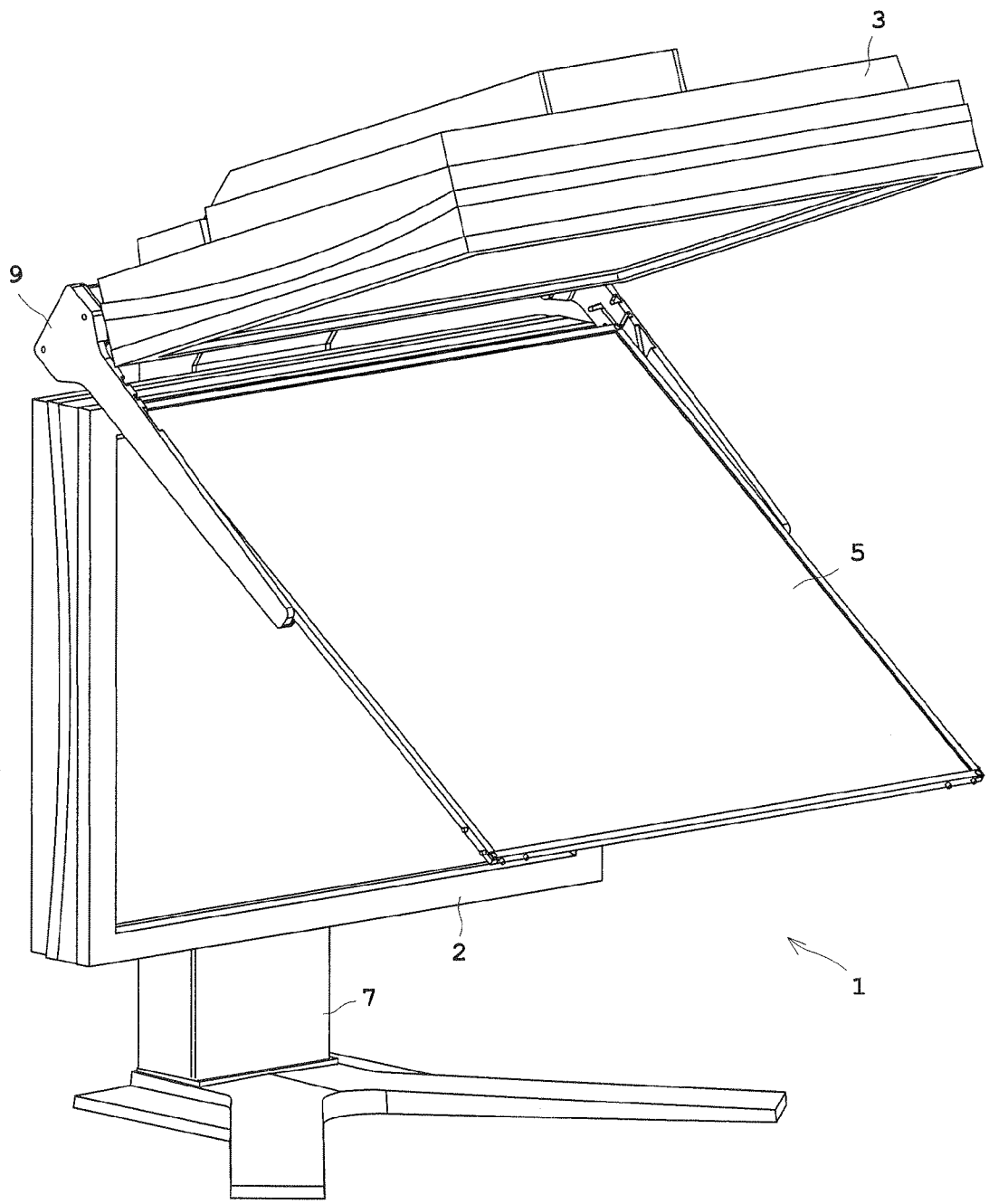
FIG. 1 is a perspective view showing a construction of a stereoscopic image display apparatus according to Embodiment 1.

1, 1B . . . stereoscopic image display apparatus
2, 2A, 2B . . . image display devices
3, 3A, 3B . . . image display devices
5, 5A, 5B . . . half mirror
11 . . . display unit
13, 13A, 13B . . . linear polarization plates
15 . . . display unit
17, 17A, 17B . . . linear polarization plates
19 . . . ½ wavelength plate
21, 21A, 21B . . . linear polarization plates
23 . . . half mirror portion
23a . . . transparent layer
23b . . . half mirror layer
25 . . . image signal generating unit
27 . . . vertical image reversing unit Embodiment 1

Figure 2:
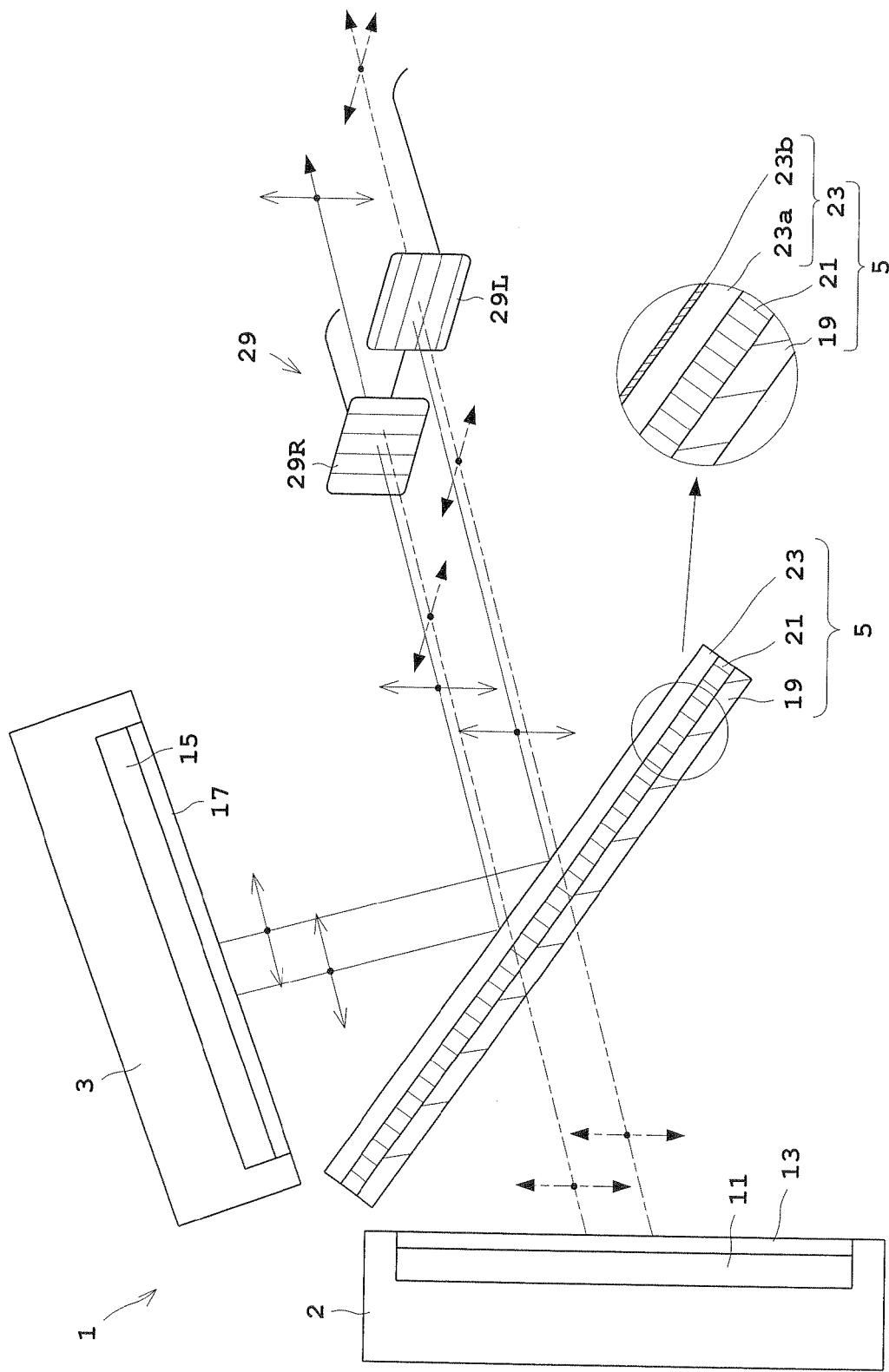
FIG. 2 is an outline schematic view of the stereoscopic image display apparatus according to Embodiment 1.
Figure 3:
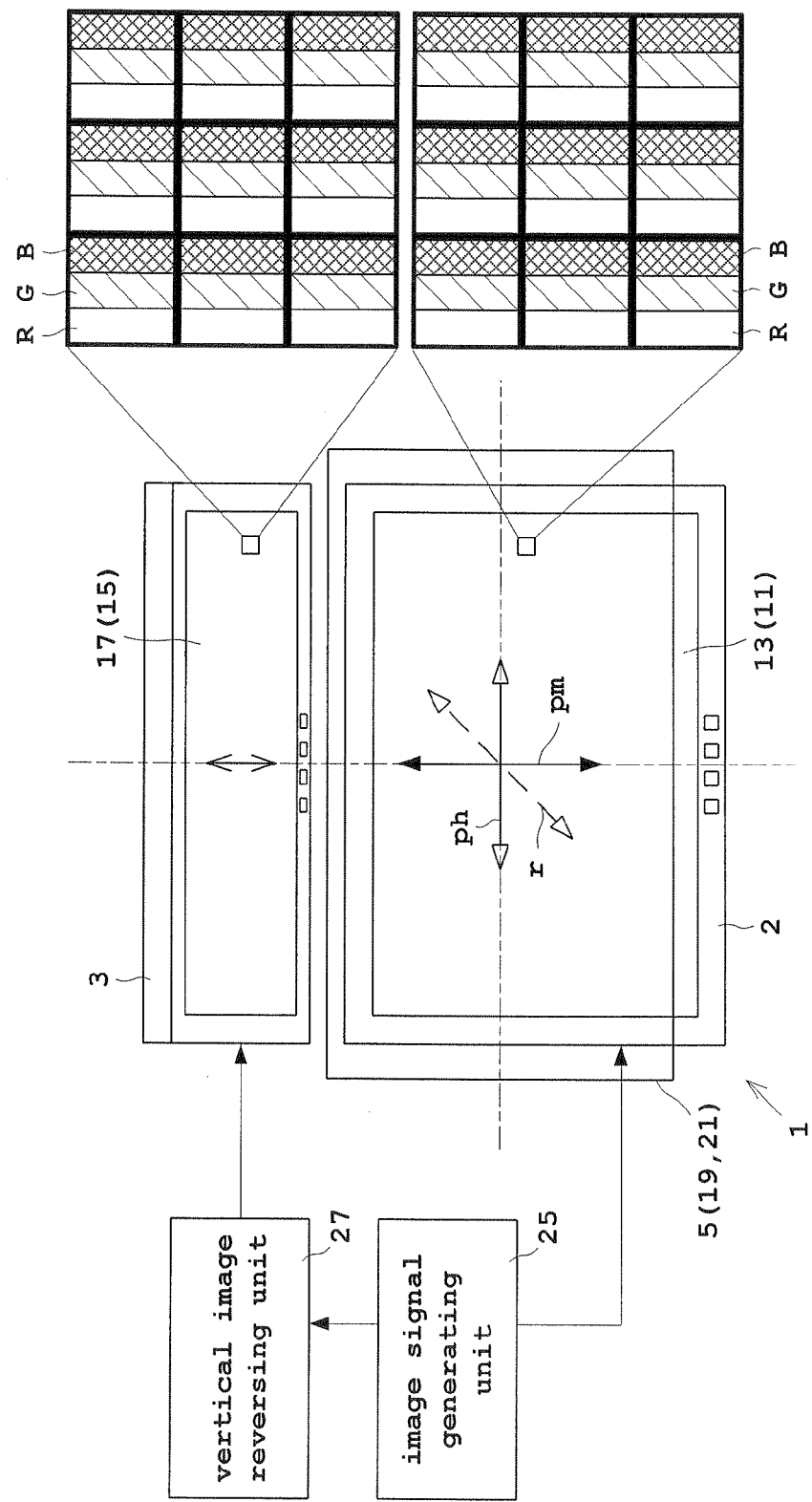
FIG. 3 is a view showing a relationship between an arrangement of two image display devices of the stereoscopic image display apparatus according to Embodiment 1 and sub-pixels, and a control system of the stereoscopic image display apparatus.

Embodiment 1 of this invention will be described hereinafter with reference to the drawings. FIG. 1 is a perspective view showing a construction of a stereoscopic image display apparatus according to Embodiment 1. FIG. 2 is an outline schematic view of the stereoscopic image display apparatus. FIG. 3 is a view showing a relationship between an arrangement of two image display devices of the stereoscopic image display apparatus according to Embodiment 1 and sub-pixels, and a control system of the stereoscopic image display apparatus.

<Construction of the Stereoscopic Image Display Apparatus>

Reference is made to FIG. 1. A stereoscopic image display apparatus 1 includes an image display device 2, an image display device 3 disposed in a position for forming an angle with the image display device 2, and a half mirror 5 disposed to extend from a corner of the image display device 2 and image display device 3 to an area between the image display device 2 and image display device 3.

Further, the stereoscopic image display apparatus 1 includes a stand 7 which supports the two image display devices 2 and 3, and a half mirror support member 9 attached to the stand 7 for supporting the half mirror 5.

The image display device 2 corresponds to the first image display device in this invention, and the image display device 3 to the second image display device in this invention.

As shown in FIG. 2, the image display device 2 includes a display unit 11 for displaying an image which is either one of an image for the left eye and an image for the right eye, and a linear polarization plate 13 provided on a front plane of the display unit 11 and having a vertical polarizing direction. The image display device 3 includes a display unit 15 for displaying an image different to the image display device 2, which is either one of an image for the left eye and an image for the right eye, and a linear polarization plate 17 provided on a front plane of the display unit 15 and having the same vertical polarizing direction as the linear polarization plate 13. For example, when the image for the left eye is displayed on the image display device 2, the image for the right eye is displayed on the image display device 3.

The image display devices 2 and 3 comprise liquid crystal display panels, for example. In this case, a construction in which the display unit 11 is sandwiched between the linear polarization plate 13 disposed on the front plane of the display unit 11 and a linear polarization plate (not shown) disposed on a rear plane of the display unit 11 corresponds to a liquid crystal display panel.

The half mirror 5 has functions to transmit the light of the image displayed on the image display device 2 and reflect the light of the image displayed on the image display device 3. Consequently, the observer can observe an image composed of the two images displayed on the image display devices 2 and 3.

The half mirror 5 has, laminated and formed in order from the incidence side of an image light transmitting plane of the half mirror 5, a ½ wavelength plate 19 for rotating the direction of polarization of the light subjected to linear polarization, and a linear polarization plate 21 for adjusting the direction of polarization of the light of the image having passed through the ½ wavelength plate 19. That is, the half mirror 5 has the ½ wavelength plate 19, linear polarization plate 21 and a half mirror portion 23 arranged in order from lower left in FIG. 2. As shown in enlargement in FIG. 2, the half mirror portion 23 is formed of a half mirror layer 23b vapor-deposited on a transparent layer 23a made of a material such as glass or synthetic resin. The ½ wavelength plate 19, linear polarization plate 21 and half mirror portion 23 are bonded to one another with an optical adhesive having the same refractive index as the material forming the transparent layer 23a of the half mirror portion 23. The linear polarization plate 21 has a function to eliminate a wavelength dispersion of light due to birefringence in the ½ wavelength plate 19. This can prevent rainbow patterns and variations in display color due to a wavelength dispersion of light. The half mirror 5, provided with the linear polarization plate 21, can inhibit unnecessary reflection by causing the linear polarization plate 21 to absorb part of the light of the image transmitted through the half mirror portion 23.

As shown in FIG. 3, the half mirror 5 is formed such that the ½ wavelength plate 19 has a slow axis r inclined 45 degrees to polarizing direction ph of the linear polarization plate 21, and arranged such that the polarizing direction ph of the linear polarization plate 21 of the half mirror 5 extends perpendicular to polarizing direction pm of the linear polarization plate 13 of the image display device 2. Consequently, the light of the image polarized in the vertical direction can be rotated 90 degrees to become the light of an image polarized in the horizontal direction, for example. What is rotated 90 degrees by the ½ wavelength plate 19 is the direction of polarization of the light, and the image itself does not rotate.

The half mirror 5 is constructed attachable to and detachable from the half mirror support unit 9. The half mirror 5 has a half mirror mounting mechanism which can be attached in whichever of a vertical posture or a sideways posture to the half mirror support unit 9. For example, the half mirror 5 may be detached from the half mirror support unit 9, rotated 90 degrees along the plane of the half mirror 5, that is the half mirror 5 is rotated from vertical to horizontal or from horizontal to vertical, and may then be attached again.

Preferably, the half mirror 5 has its plane shaped square. This eliminates a feeling of strangeness due to a size difference between vertical and horizontal when the half mirror 5 is attached in the vertical direction and the horizontal direction, and can present images in the same area vertically and horizontally.

As shown in FIG. 3, the image display devices 2 and 3 are usually arranged such that an upper position of the image display device 2 is opposed to a lower position of the image display device 3 when upper positions of the images displayed on the display units 11 and 15 are located in the upper positions of the image display devices 2 and 3, and left sides of the images are located at left sides of the image display devices 2 and 3. That is, in the image composed of the images displayed on the image display devices 2 and 3, respectively, and transmitted through and reflected by the half mirror 5, the colors of RGB sub-pixels are arranged in the same order and positions. With this arrangement, display states of the images for the left eye and right eye of the observer are in agreement, thereby enabling observation of a stereoscopic image of improved quality.

The display unit 11 corresponds to the first display unit in this invention, the display unit 15 to the second display unit in this invention, the linear polarization plate 13 to the first linear polarization plate in this invention, the linear polarization plate 17 to the second linear polarization plate in this invention, the ½ wavelength plate 19 to the polarized light rotating layer in this invention, and the linear polarization plate 21 to the linear polarization layer in this invention.

<Control System>

The stereoscopic image display apparatus 1 has an image signal generating unit 25 and a vertical image reversing unit 27. The image signal generating unit 25 comprises a PC or the like. The image signal generating unit 25 is electrically connected to the image display devices 2 and 3 through signal lines, respectively, to transmit image signals for display on the image display devices 2 and 3. The vertical image reversing unit 27 is disposed in an intermediate position on the signal line which transmits the image signals to the image display device 3. This vertical image reversing unit 27 receives and processes the image signals from the image signal generating unit 25, and transmits image signals of a vertically reversed image to the image display device 3. The vertical image reversing unit 27 causes the image display device 3 to display the vertically reversed image, whereby the observer is presented with the transmitted image from the image display device 2 and the reflected image from the image display device 3 properly adjusted with respect to the four directions.

<Description of Operation of the Stereoscopic Image Display Apparatus>

Next, operation of the stereoscopic image display apparatus will be described. Here, description will be made, particularly, of operation up to allowing the observer to observe, as a stereoscopic image, the images displayed on the image display devices 2 and 3.

Reference is made to FIG. 2. The light of the image displayed on the display unit 11 of the image display device 2 is polarized in the vertical direction by and emitted from the linear polarization plate 13 disposed on the front plane of the display unit 11 and having the vertical polarizing direction. The vertically polarized light of the image falls on the half mirror 5. First, the ½ wavelength plate 19 formed on the half mirror 5 rotates the light of the image 90 degrees, and transmits the light with the direction of polarization changed from vertical to horizontal. And the light of the image with the direction of polarization turned to horizontal by the ½ wavelength plate 19 passes through the linear polarization plate 21 having the horizontal polarizing direction. The direction of polarization is adjusted by transmitting only the light of the image in the horizontal direction. That is, by passing through the half mirror 5, the light of the image has the direction of polarization rotated 90 degrees from vertical to horizontal. The horizontally polarized light of the image transmitted through the half mirror 5 travels toward the location of the observer.

On the other hand, the light of the image displayed on the image display device 3 is polarized in the vertical direction by and emitted from the linear polarization plate 17 disposed on the front plane of the display unit 15 and having the vertical polarizing direction. The vertically polarized light of the image is reflected by the half mirror 5. The light of the image reflected by the half mirror 5, with the direction of polarization remaining vertical, travels toward the location of the observer.

Therefore, the light of the image displayed on the image display device 2 travels toward the location of the observer as the light of the image transmitted through the half mirror 5 and rotated from the vertical direction to be polarized in the horizontal direction, and the light of the image displayed on the image display device 3 as the light of the image reflected by the half mirror 5 and remaining to be polarized in the vertical direction. That is, the observer can observe an image composed, by the half mirror 5, of the two images displayed on the image display devices 2 and 3 and having the different, vertical and horizontal directions of polarization. And the observer observes, with the right and left eyes, through glasses 29 with polarization plates, i.e. linear polarization plates 29L and 29R having the different, vertical and horizontal polarizing directions, thereby to be able to see, as distributed to the right and left eyes, the lights of the images displayed on the image display devices 2 and 3 and polarized in the different, vertical and horizontal directions. Specifically, of the glasses 29 with the polarization plates, the linear polarization plate 29R for the right eye which has the vertical polarizing direction allows observation of the image for the right eye on the image display device 3 displayed as reflected by the half mirror 5. The linear polarization plate 29L for the left eye which has the horizontal polarizing direction allows observation of the image for the left eye on the image display device 2 displayed as transmitted through the half mirror 5. As a result, the observer can see the image for the left eye and the image for the right eye with a parallax difference, as distributed to the right and left eyes, thereby to be able to observe a stereoscopic image.

<Half Mirror Mounting Mechanism>

Figure 4:
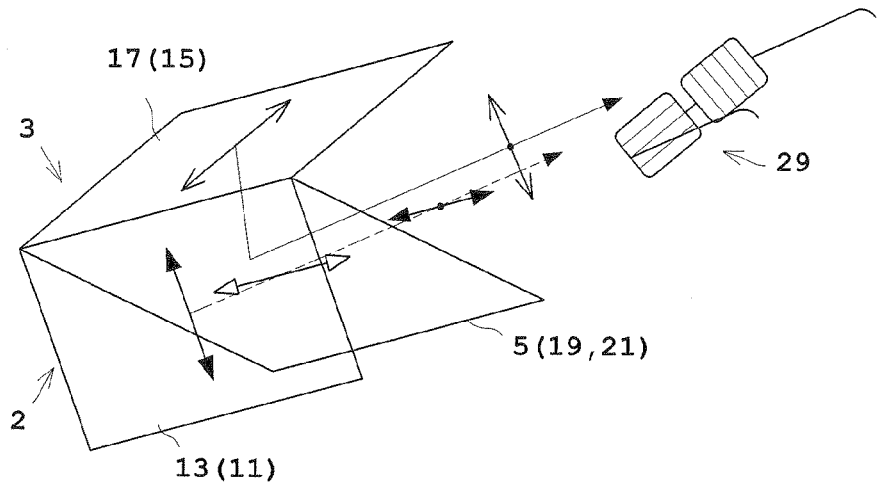
FIG. 4 are explanatory views of a position of a half mirror when a polarizing direction of linear polarization plates is changed by interchanging the two image display devices, in which (a) is an outline perspective view of the apparatus before the change of the polarizing direction, (b) is an outline perspective view of the apparatus after the change of the polarizing direction, and (c) is an outline perspective view of the apparatus when the half mirror is mounted as rotated 90 degrees.
Figure 4:
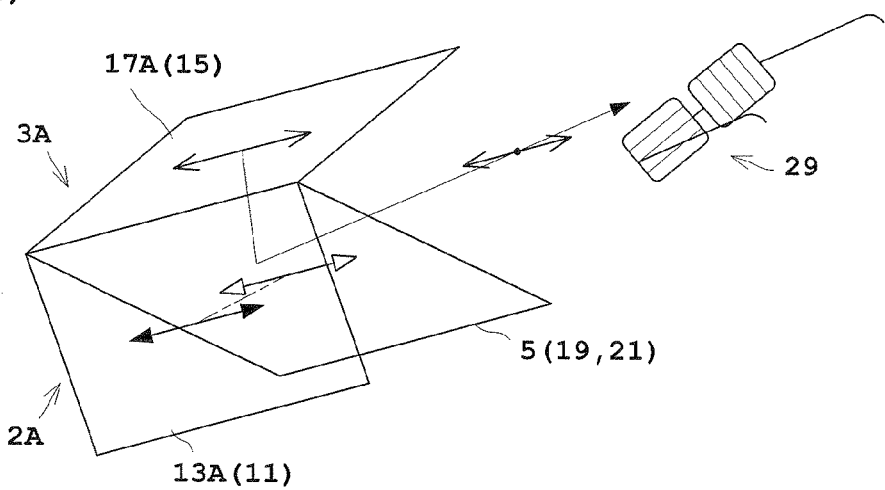
Figure 4:
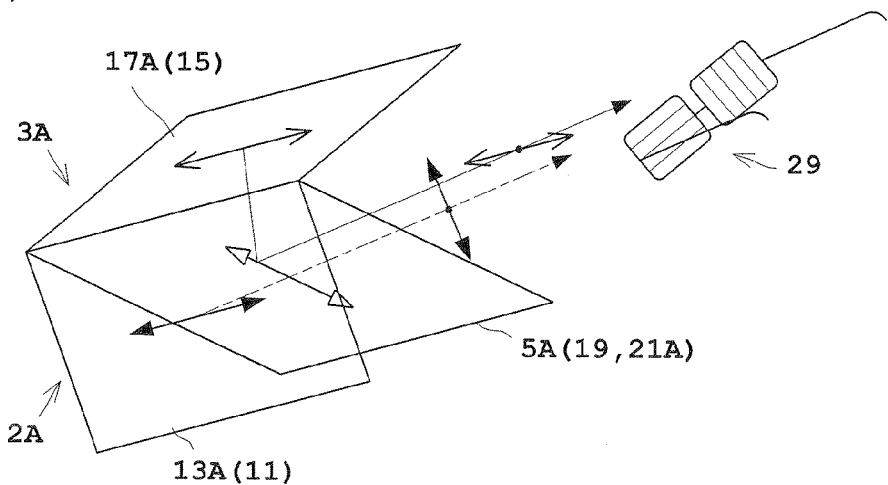

Next, in the stereoscopic image display apparatus, the half mirror has the half mirror mounting mechanism which can be attached in whichever of a vertical posture or a sideways posture to the half mirror support unit 9. This half mirror mounting mechanism will be described. FIG. 4 are explanatory views of a position of the half mirror when a polarizing direction of linear polarization plates is changed by interchanging the two image display devices, in which (a) is an outline perspective view of the apparatus before the change of the polarizing direction, (b) is an outline perspective view of the apparatus after the change of the polarizing direction, and (c) is an outline perspective view of the apparatus when the half mirror is mounted as rotated 90 degrees.

FIG. 4 (a) shows the stereoscopic image display apparatus 1 having the construction described above, and includes the two image display devices 2 and 3 having the linear polarization plates 13 and 17 disposed on the front planes of the display units 11 and 15 and having a vertical polarizing direction, and the half mirror 5 formed by laminating the ½ wavelength plate 19 and linear polarization plate 21. The polarizing direction of the linear polarization plate 21 of the half mirror 5 extends perpendicular to the polarizing direction of the linear polarization plate 13 of the image display device 2.

In FIG. 4 (b), a change has been made from the linear polarization plates 13 and 17 having the vertical polarizing direction as shown in FIGS. 4 (a) to 13A and 17A having a horizontal polarizing direction. The polarizing direction of the linear polarization plates may be changed in this way, for example, by using as replacement two other image display devices 2A and 3A with linear polarization plates having a different polarizing direction (e.g. changed from the vertical direction to the horizontal direction).

When a change has been made to the image display devices 2A and 3A having the linear polarization plates 13A and 17A with the horizontal polarizing direction as described above, the horizontally polarized light of the image emitted from the image display device 3A through the linear polarization plate 17A is reflected by the half mirror 5 to travel, with the direction of polarization remaining horizontal, toward the location of the observer. On the other hand, the light of the image emitted from the image display device 2A through the linear polarization plate 13A falls on the half mirror 5. The ½ wavelength plate 19 rotates the direction of polarization of the light of the image from the horizontal direction to the vertical direction. However, the light of the image rotated and polarized in the vertical direction will fall on the linear polarization plate 21 of the half mirror 5, with the direction of polarization at right angles to the horizontal direction of polarization of the latter, thereby to be absorbed by the linear polarization plate 21. Therefore, the observer can see only the image reflected by the half mirror 5, and cannot observe a stereoscopic image.

However, the half mirror 5 has the half mirror mounting mechanism which can be attached in whichever of a vertical posture or a sideways posture. So, as shown in FIG. 4 (c), the polarizing direction of the linear polarization plate 21A of the half mirror 5A can be changed from horizontal to vertical by reattaching the half mirror 5 after rotating 90 degrees along its plane. Then, the light of the image emitted from the image display device 2A through the linear polarization plate 13A has the direction of polarization rotated from horizontal to vertical by the ½ wavelength plate 19 of the half mirror 5A. Since the linear polarization plate 21A of the half mirror 5 also has a vertical polarizing direction, only the vertically polarized light of the image can be transmitted. That is, the horizontally polarized light of the image from the image display device 2A has the direction of polarization rotated as it is transmitted through the half mirror 5A, and travels as polarized in the vertical direction toward the location of the observer. The horizontally polarized light of the image from the image display device 3A is reflected by the half mirror 5A to travel, with the direction of polarization remaining horizontal, toward the location of the observer. Therefore, the observer can observe a stereoscopic image through the glasses 29 with polarization plates.

In FIG. 4 (a), the image for the left eye of the image display device 2 was able to be seen by the observer's left eye, and the image for the right eye of the image display device 3 by the observer's right eye. In FIG. 4 (c), however, the image for the left eye of the image display device 2A is seen by the observer's right eye, the image for the right eye of the image display device 3A by the observer's left eye. The converse images will be projected to the observer's right and left eyes. It is therefore necessary to interchange the right and left linear polarization plates 29L and 29R of the glasses 29 having the polarization plates, to interchange the image for the left eye and the image for the right eye displayed on the two image display devices 2A and 3A, or to interchange the signal lines connected to the two image display devices 2A and 3A.

<Method of Setting the Transmittance and Reflectance of the Half Mirror Layer>

Figure 5:
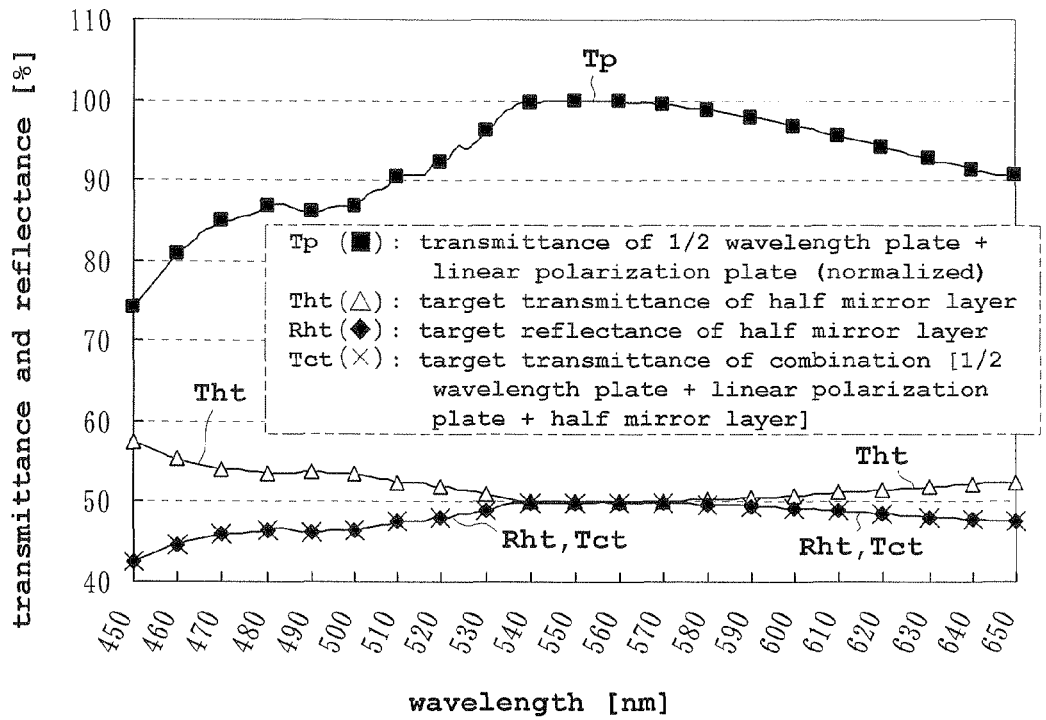
FIG. 5 is a view showing spectral characteristics of normalized transmittance of a combination of a ½ wavelength plate and a linear polarization plate, and target spectral characteristics of transmittance and reflectance of a half mirror layer.
Figure 6:
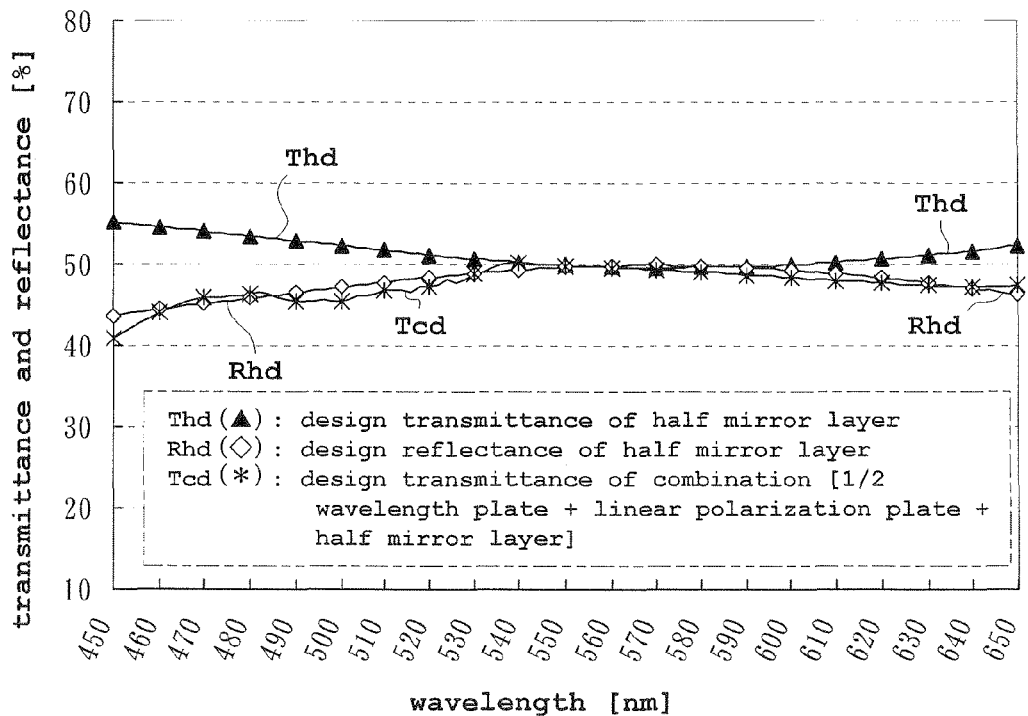
FIG. 6 is a view showing design results of the half mirror layer based on the spectral characteristics of the transmittance and reflectance of the half mirror layer shown in FIG. 5.

Next, a method of setting the transmittance and reflectance of the half mirror layer 23b will be described. FIG. 5 is a view showing spectral characteristics of normalized transmittance of a combination of the ½ wavelength plate and the linear polarization plate, and target spectral characteristics of the transmittance and reflectance of the half mirror layer. FIG. 6 is a view showing design results of the half mirror layer based on the spectral characteristics of the transmittance and reflectance of the half mirror layer shown in FIG. 5.

As described hereinbefore, the half mirror 5 has the ½ wavelength plate 19, linear polarization plate 21 and half mirror portion 23 arranged in order from lower left in FIG. 2. Of these, the half mirror layer 23b of the half mirror portion 23 is usually formed to have the same transmittance and reflectance. However, the ½ wavelength plate 19 and linear polarization plate 21 have such characteristics that the transmittance varies with the wavelength of light. Therefore, when the half mirror 5 is simply formed of the ½ wavelength plate 19, linear polarization plate 21 and half mirror portion 23, transmittance (transmitted light) and reflectance (reflected light) will greatly vary with wavelength. When transmittance and reflectance greatly vary with wavelength, the RGB of the color of the image will lose balance. Therefore, when the observer observes the images displayed on the two image display devices 2 and 3 through the half mirror 5, there occurs a great color difference between the images, which causes stress given to the observer at the time of stereoscopic viewing.

Then, target transmittance and reflectance of the half mirror layer 23b of the half mirror portion 23 are calculated as follows, and the half mirror layer 23b is set based on the transmittance and reflectance.

First, a transmittance for each wavelength n of a combination of the ½ wavelength plate 19 and linear polarization plate 21 is acquired by actual measurement with a spectroscope, for example. A maximum transmittance is obtained from among the transmittances acquired for the wavelengths n. The transmittance for each wavelength is divided by this maximum transmittance, to obtain spectral characteristics (spectral transmittance ratio data) of transmittance normalized with the maximum transmittance. One example thereof is shown with a curve Tp in FIG. 5.

And a relationship in equation [1] shown below is formed, in which Tp(n) is the normalized transmittance for each wavelength n of the combination of the ½ wavelength plate 19 and linear polarization plate 21, Th(n) is the transmittance of the half mirror layer 23b, and Rh(n) is the reflectance thereof. That is, Th(n)×Tp(n) expresses the transmittance of a combination of the transmittance Th(n) of the half mirror layer 23b and the transmittance Tp(n) of the ½ wavelength plate 19 and linear polarization plate 21. And Th(n)×Tp(n) and the reflectance Rh(n) of the half mirror layer 23b are made equal.

$$Th(n) \times Tp(n) = Rh(n) \quad [1]$$

A relationship in the following equation [2] is formed, in which the sum of the transmittance Th(n) and reflectance Rh(n) of the half mirror layer 23b is 1. That is to say a relationship in which all light not reflected by the half mirror layer 23b is transmitted.

$$Th(n) + Rh(n) = 1 \quad [2]$$

Tp(n) is a proper fixed value. The following relationship is derived from equations [1] and [2] above. This equation provides a target transmittance of the half mirror layer 23b at the time of forming the half mirror layer 23b.

$$Th(n) = 1/(1 + Tp(n)) \quad [3]$$

A target transmittance of the half mirror layer 23b is obtained, for example, by substituting into equation [3] above the normalized transmittance for each wavelength n of the ½ wavelength plate 19 and linear polarization plate 21 shown with the curve Tp in FIG. 5. The reflectance is obtained by substituting into the foregoing equation [2] the transmittance derived from equation [3]. This secures target, ideal transmittance and reflectance of the half mirror layer 23b as shown in FIG. 5.

Reference is made to FIG. 5. Curve Tht shows the target transmittance of the half mirror layer 23b. Curve Rht shows the target reflectance of the half mirror layer 23b. Multiplying, for each wavelength n, the target transmittance shown with curve Tht by the normalized transmittance of the ½ wavelength plate 19 and linear polarization plate 21 shown with curve Tp in FIG. 5 will result in curve Rht, which is seen to overlap the target reflectance shown with curve Tht. That is, the transmittance of the half mirror layer 23b combined with the ½ wavelength plate 19 and linear polarization plate 21 can be made to coincide with the reflectance of the half mirror layer 23b for each wavelength.

Reference is made to FIG. 6. It shows half mirror coating design results set based on the target transmittance and reflectance of the half mirror layer 23b shown in FIG. 5. The half mirror layer 23b, when formed of dielectric multilayer film, for example, is designed by determining a refractive index (quality of the material) and a thickness of each layer of the multiple layers, and the number of layers. Curve Thd shows design values of the transmittance of the half mirror layer 23. Curve Rhd shows design values of the reflectance of the half mirror layer 23b. Multiplying, for each wavelength, the transmittance of the half mirror layer 23b shown with curve Thd by the transmittance of the ½ wavelength plate 19 and linear polarization plate 21 shown with curve Tp in FIG. 5 will result in the transmittance shown with curve Tcd. Thus, it is seen that the design reflectance (curve Rhd) of the half mirror layer 23b, and the transmittance (curve Tcd) of the combination of the half mirror layer 23b (design transmittance), ½ wavelength plate 19 and linear polarization plate 21, largely overlap each other.

Thus, the target transmittance and reflectance of the half mirror layer 23b are determined so that the transmittance of the half mirror layer 23b, ½ wavelength plate 19 and linear polarization plate 21 in transmitting light may be equal to the reflectance of the half mirror layer 23b. And the half mirror layer 23b is designed based on the transmittance and reflectance of the half mirror layer 23b. Based on the design values of the half mirror layer 23b, the half mirror layer 23b is formed by a method of coating dielectric multilayer film or metallic thin film, or a known method such as applying a film having undergone half mirror processing. Consequently, a difference between transmittance (transmitted light) and reflectance (reflected light) for each wavelength of the half mirror 5 can be made small. Therefore, when the observer observes the images displayed on the two image display devices 2 and 3 through the half mirror 5, the color difference between the images can be made small. Therefore, the stress given to the observer at the time of stereoscopic viewing can be lightened. The observer can also observe a high-quality stereoscopic image.

The above stereoscopic image display apparatus includes the half mirror 5 having the ½ wavelength plate 19 and linear polarization plate 21 laminated and formed in order from the incidence side of the image transmitting plane of the half mirror 5. With this construction, when the vertically polarized light of the image emitted from the image display device 2 through the linear polarization plate 13 passes through the half mirror 5, the direction of polarization of the light of the image is first rotated from vertical to horizontal by the ½ wavelength plate 19, and the horizontally polarized light of the image is adjusted so that only the image polarized in the horizontal direction can pass through the linear polarization plate 21 having the horizontal polarizing direction. That is, the half mirror 5 can rotate 90 degrees and emit the linearly polarized incident light. Therefore, when image display devices with linear polarization plates having the same polarizing direction disposed on the front planes of display units are used, the linearly polarized light of the image displayed from one image display device can be rotated and polarized in a different direction. Consequently, the observer can see, through the glasses 29 with polarization plates having the different, vertical and horizontal polarizing directions, the images displayed on the image display devices 2 and 3, with the image for the left eye and the image for the right eye having a parallax difference, as distributed to the right and left eyes, thereby to be able to observe a stereoscopic image.

The half mirror 5 has the ½ wavelength plate 19 and linear polarization plate 21 laminated and formed thereon. This can be manufactured more easily and at lower manufacturing cost than a construction having the ½ wavelength plate and linear polarization plate on the front display plane of one of the two image display devices with linear polarization plates having the same polarizing direction, or manufacturing two image display devices with linear polarization plates having different polarizing directions.

The arrangement is made in which the upper position of the image display device 2 is opposed to the lower position of the image display device 3. That is, in the image composed of the images displayed on the image display devices 2 and 3, respectively, and transmitted through and reflected by the half mirror 5, the colors of RGB sub-pixels are arranged in the same order and positions. With this arrangement, display states of the images for the left eye and right eye of the observer are in agreement, thereby enabling observation of a stereoscopic image of improved quality.

When a change is made in the polarizing direction of the linear polarization plates of the display units of the image display devices 2 and 3, e.g. when the polarizing direction is changed from vertical to horizontal, the half mirror can be rotated and attached in the vertical direction or horizontal direction to enable observation of a stereoscopic image. Therefore, there is no fear of becoming unable to observe a stereoscopic image by the polarizing direction of the linear polarization plates of the image display devices. There is no need to remake a new half mirror 5, either.

Embodiment 2

Figure 7:
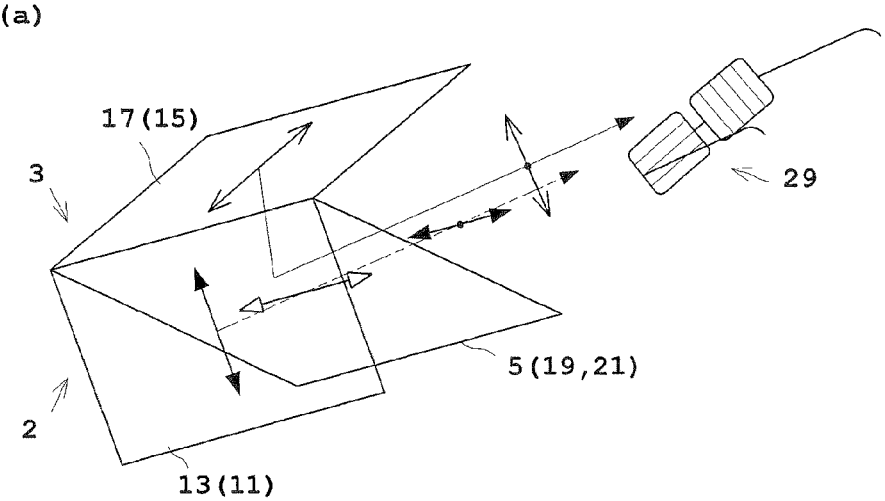
FIG. 7 are explanatory views of the position of the half mirror when the polarizing direction of the linear polarization plates is changed by rotating and arranging the two image display devices, in which (a) is an outline perspective view of the apparatus before the change of the polarizing direction, (b) is an outline perspective view of the apparatus after the change of the polarizing direction, and (c) is an outline perspective view of the apparatus when the half mirror is mounted as rotated 90 degrees.
Figure 7:
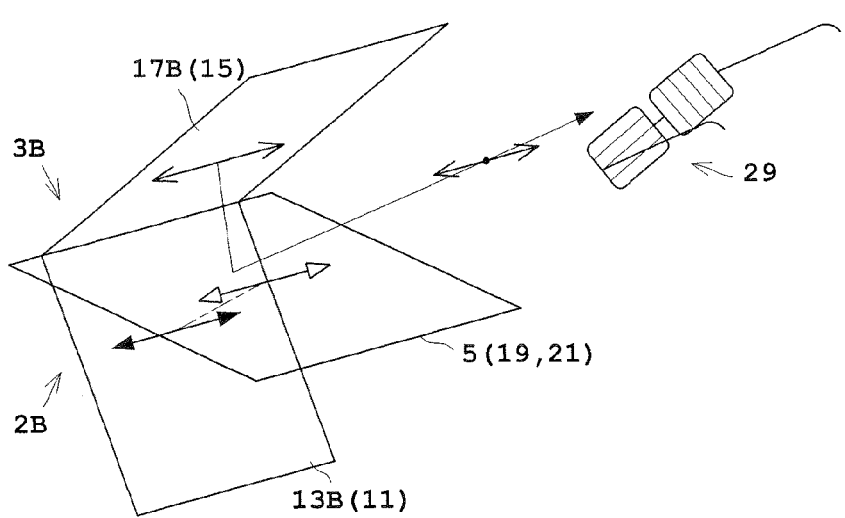
Figure 7:
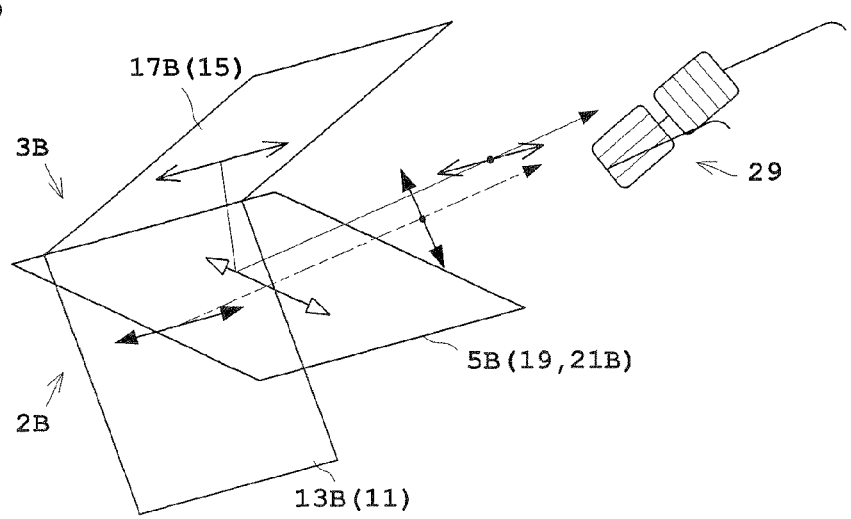
Figure 8:
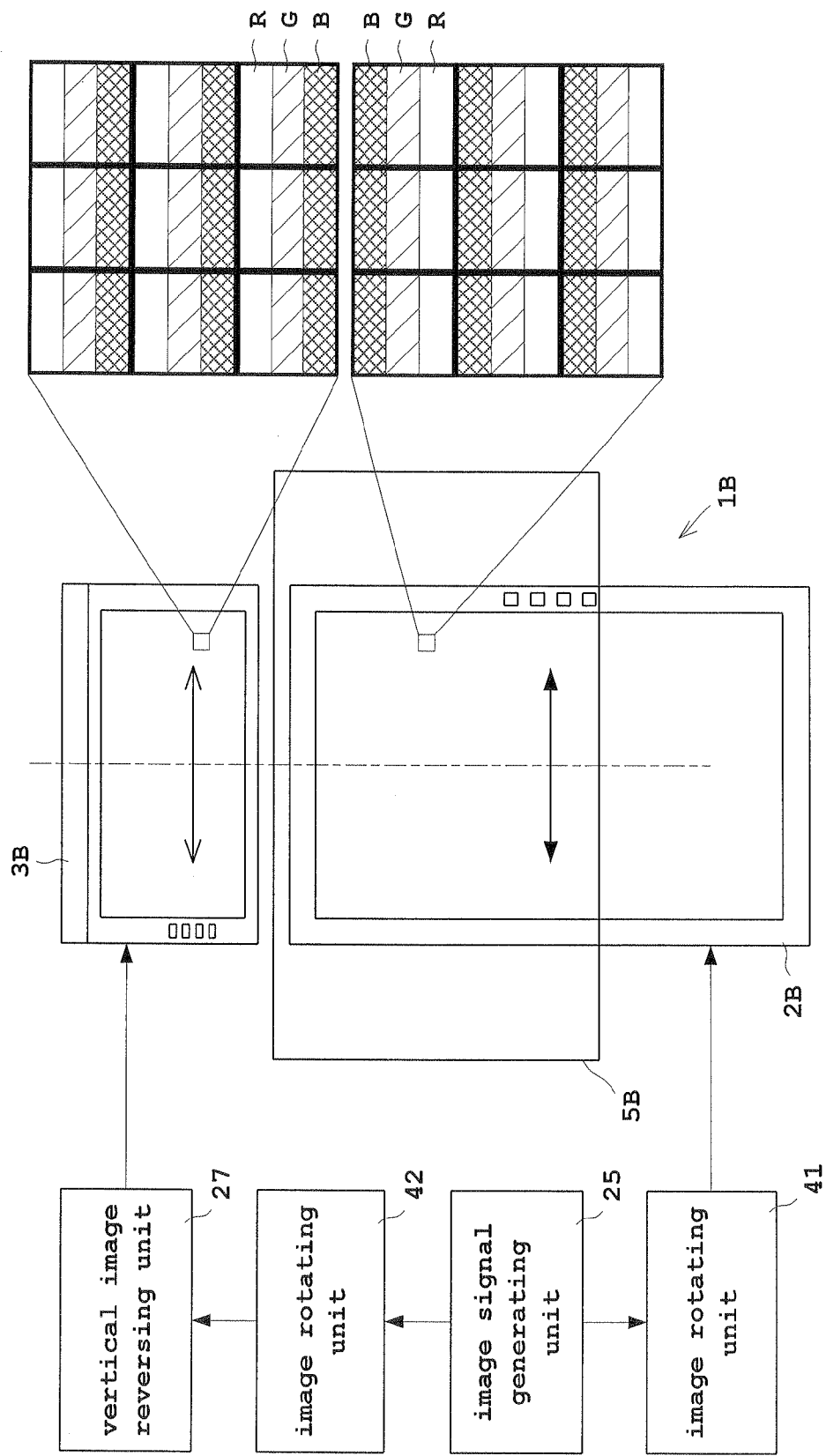
FIG. 8 is a view showing a relationship between an arrangement of two image display devices of a stereoscopic image display apparatus according to Embodiment 2 and sub-pixels, and a control system of the stereoscopic image display apparatus.

Next, Embodiment 2 of this invention will be described with reference to the drawings. FIG. 7 are explanatory views of a position of a half mirror when a polarizing direction of linear polarization plates is changed by rotating and arranging two image display devices, in which (a) is an outline perspective view of the apparatus before the change of the polarizing direction, (b) is an outline perspective view of the apparatus after the change of the polarizing direction, and (c) is an outline perspective view of the apparatus when the half mirror is mounted as rotated 90 degrees. FIG. 8 is a view showing a relationship between an arrangement of two image display devices of a stereoscopic image display apparatus according to Embodiment 2 and sub-pixels, and a control system of the stereoscopic image display apparatus. The same components as in Embodiment 1 will not be described.

In Embodiment 1, the case where a change is made in the polarizing direction of the linear polarization plates 13 and 17 of the two image display devices 2 and 3 has been described taking, as an example, the case of changing to two other image display devices with linear polarization plates having a different polarizing direction (e.g. changed from the vertical direction to the horizontal direction). However, this is not limitative. It is also possible to cope with the case of rotating the two image display devices along the display planes thereof, for example.

As shown in FIG. 7 (*a*), the stereoscopic image display apparatus in Embodiment 2 includes two image display devices 2 and 3 with linear polarization plates having a vertical polarizing direction, and a half mirror 5 with a ½ wavelength plate 19 and a linear polarization plate 21 laminated and formed thereon. The two image display devices 2 and 3 are attached to the stand 7 through a rotating mechanism (not shown) having a function for rotation along the display planes of the image display devices, for example.

From the state shown in FIG. 7 (*a*), the rotating mechanism, not shown, rotates the two image display devices 90 degrees along the display planes thereof, so that the two image display devices may not interfere each other. Then, as shown in FIG. 7 (*b*), the horizontally long display planes become vertically long as a result of the 90-degree rotation, and the polarizing direction of the linear polarization plates 13 and 17 changes from vertical to horizontal.

Then, as in FIG. 4 (*b*), the horizontally polarized light of the image emitted from the image display device 3B through the linear polarization plate 17B is reflected by the half mirror 5 to travel, with the direction of polarization remaining horizontal, toward the location of the observer. However, the light of the image emitted from the image display device 2B through the linear polarization plate 13B, as in FIG. 4 (*b*), is absorbed by the linear polarization plate 21 of the half mirror 5. Therefore, the observer can see only the image reflected by the half mirror 5, and cannot see a stereoscopic image.

So, as shown in FIG. 7 (*c*), and as in FIG. 4 (*c*), the polarizing direction of the linear polarization plate 21 of the half mirror 5 can be changed from horizontal to vertical by reattaching the half mirror 5 after rotating 90 degrees along its plane. Then, the light of the image has the direction of polarization rotated from horizontal to vertical by the ½ wavelength plate 19 of the half mirror 5B. Since the linear polarization plate 21B of the half mirror 5B also has a vertical polarizing direction, only the vertically polarized light of the image can be transmitted. Therefore, the observer can observe a stereoscopic image through the glasses 29 with polarization plates.

Reference is made to FIG. 8. FIG. 8 shows the two image display devices 2 and 3 of the stereoscopic image display apparatus 1 in Embodiment 1 shown in FIG. 3 having been rotated along the display planes, respectively. The image display device 2B, for example, is positioned as rotated 90 degrees counterclockwise relative to the image display device 2 shown in FIG. 3. The image display device 3B is positioned as rotated 90 degrees clockwise relative to the image display device 2. By making the directions of rotation opposite, the order of the colors of RGB sub-pixels can be symmetrically arranged between the image display devices 2B and 3B. Therefore, composed by transmission through and reflection by the half mirror 5B, the composed image can have the colors of RGB sub-pixels in the same order. Further, by adjusting also positions of the colors of RGB sub-pixels, display states of the images for the left eye and right eye of the observer are made in agreement, thereby enabling observation of a stereoscopic image of improved quality.

The stereoscopic image display apparatus 1 has an image signal generating unit 25 and a vertical image reversing unit 27. Further, an image rotating unit 41 is provided between the image signal generating unit 25 and image display device 2B, and an image rotating unit 42 between the image signal generating unit 25 and vertical image reversing unit 27. The image rotating units 41 and 42 act in directions to negate the rotations of the image display devices 2B and 3B. That is, since the image display device 2B shown in FIG. 8 is positioned as rotated 90 degrees counterclockwise relative to the image display device 2 shown in FIG. 3, a process is carried out to rotate the image 90 degrees clockwise. Since the image display device 3B shown in FIG. 8 is positioned as rotated 90 degrees clockwise relative to the image display device 3 shown in FIG. 3, a process is carried out to rotate the image 90 degrees counterclockwise.

In the construction described above, the rotations of the image display devices 2 and 3 are carried out through the rotating mechanism (not shown). Instead of being limited to this construction, the image display devices 2 and 3 may be detached from the stand 7, and attached again after rotating the image display devices 2 and 3 90 degrees.

This invention is not limited to the foregoing embodiments, but may be modified as follows. Regarding the references affixed in the description of the construction of each foregoing embodiment, the description will be made with one representative reference affixed.

(1) In each of the foregoing embodiments, the two image display devices 2 and 3 are arranged in the vertical direction to form an angle therebetween. The two image display devices 2 and 3 may be arranged in the horizontal direction to form an angle therebetween.

Figure 9:
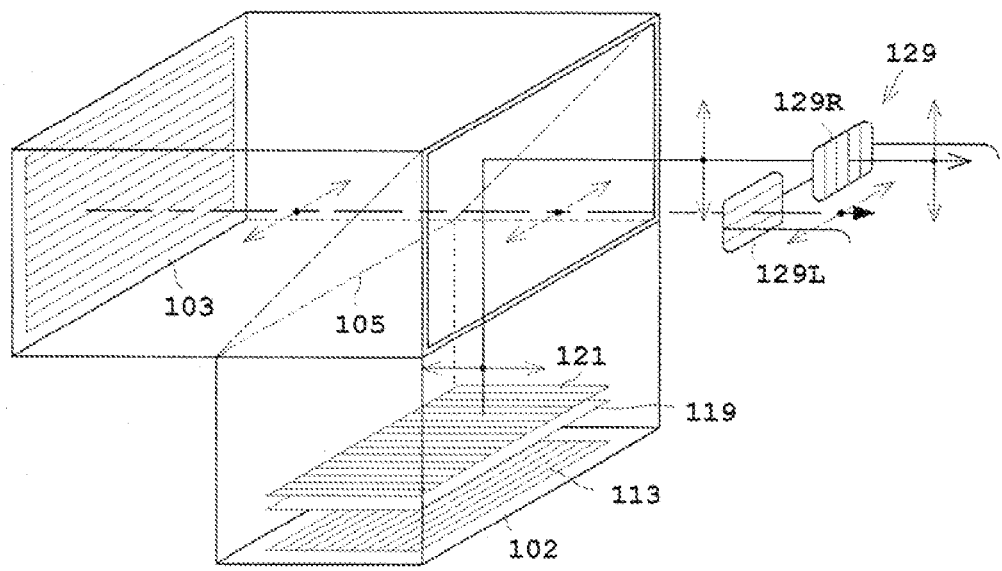
FIG. 9 is an outline perspective view showing a construction of a conventional stereoscopic image display apparatus.
Figure 10:
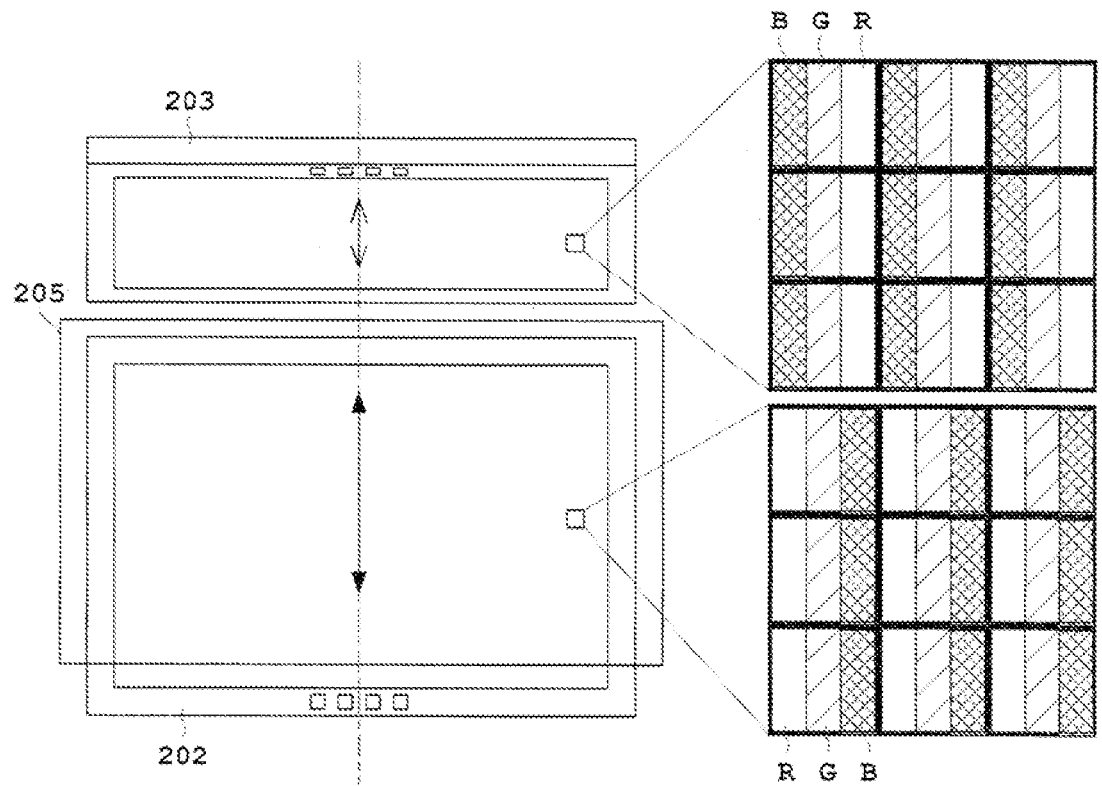
FIG. 10 is a view showing a relationship between an arrangement of two image display devices of a conventional stereoscopic image display apparatus and sub-pixels.

(2) In each of the foregoing embodiments, the two image display devices 2 and 3 are supported by the stand 7, and the half mirror 5 is supported by the stand 9 through the half mirror support unit 9. However, this construction is not limitative. As shown in FIG. 9, for example, the two image display devices 2 and 3 and half mirror 5 may be supported in a housing. In this case also, the half mirror 5, preferably, is constructed attachable in the vertical and horizontal directions by the half mirror mounting mechanism.

(3) In each of the foregoing embodiments, the half mirror 5 is formed by bonding together the ½ wavelength plate 19, linear polarization plate 21 and half mirror portion 23. However, this construction is not limitative. For example, the half mirror may be formed by bonding together the ½ wavelength plate 19 and half mirror portion 23, without using the linear polarization plate 23.

(4) In each of the foregoing embodiments, the half mirror 5 is formed by laminating the ½ wavelength plate 19 and linear polarization plate 21 on the half mirror portion 23 having the half mirror layer 23b vapor-deposited on the transparent layer 23a. However, this construction is not limitative. For example, the half mirror may have the half mirror layer applied to a linear polarization plate surface of a bonded combination of the ½ wavelength plate and linear polarization plate. The half mirror may have the half mirror layer applied to the ½ wavelength plate. Further, what can be used as the method of forming the half mirror layer is a method of coating dielectric multilayer film or metallic thin film, or a known method such as applying a film having undergone half mirror processing.

The invention claimed is:

1. A stereoscopic image display apparatus comprising:
   a first image display device including a first display unit for displaying a first image which is either one of an image for the left eye and an image for the right eye, and a first linear polarization plate disposed on a front plane of the first display unit and having either one of vertical and horizontal polarizing directions;
   a second image display device disposed in a position for forming an angle with the first image display device, and including a second display unit for displaying a second image different from the first image, which is either one of the image for the left eye and the image for the right eye, and a second linear polarization plate disposed on a front plane of the second display unit and having the same polarizing direction as the first linear polarization plate; and
   a half mirror extending from a corner of the first image display device and the second image display device to an area between the first image display device and the second image display device, having functions to transmit light of the first image displayed on the first image display device and to reflect light of the second image displayed on the second image display device, and including, as arranged in order from an incidence side of a plane for transmitting the light of the first image, a polarized light rotating layer for rotating a direction of polarization of the light having undergone linear polarization, and a half mirror layer.

2. The stereoscopic image display apparatus according to claim 1, wherein the half mirror has a linear polarization layer provided between the polarized light rotating layer and the half mirror layer for adjusting the direction of polarization of the light of the image having passed through the polarized light rotating layer.

3. The stereoscopic image display apparatus according to claim 2, wherein the half mirror is formed such that the polarized light rotating layer has a slow axis inclined 45 degrees to a polarizing direction of the linear polarization layer, and arranged such that the polarizing direction of the linear polarization layer extends perpendicular to the polarizing direction of the first linear polarization plate.

4. The stereoscopic image display apparatus according to claim 3, wherein the half mirror has a half mirror mounting mechanism which can be attached in whichever of a vertical posture or a horizontal posture.

5. The stereoscopic image display apparatus according to claim 4, wherein the half mirror is square.

6. The stereoscopic image display apparatus according to claim 4, wherein the first image display device and the second image display device are arranged such that, when the first image and the second image displayed are transmitted through or reflected by the half mirror to be composed, an order and positions of colors of sub-pixels are the same.

7. The stereoscopic image display apparatus according to claim 3, wherein the first image display device and the second image display device are arranged such that, when the first image and the second image displayed are transmitted through or reflected by the half mirror to be composed, an order and positions of colors of sub-pixels are the same.

8. The stereoscopic image display apparatus according to claim 3, wherein the half mirror layer is arranged to have a transmittance and a reflectance based on a transmittance and a reflectance of the half mirror layer determined so that a transmittance when light is transmitted through the polarized light rotating layer, the linear polarization layer and the half mirror layer be equal to the reflectance of the half mirror layer.

9. The stereoscopic image display apparatus according to claim 2, wherein the half mirror layer is arranged to have a transmittance and a reflectance based on a transmittance and a reflectance of the half mirror layer determined so that a transmittance when light is transmitted through the polarized light rotating layer, the linear polarization layer and the half mirror layer be equal to the reflectance of the half mirror layer.

10. The stereoscopic image display apparatus according to claim 2, wherein the half mirror has a half mirror mounting mechanism which can be attached in whichever of a vertical posture or a horizontal posture.

11. The stereoscopic image display apparatus according to claim 10, wherein the half mirror is square.

12. The stereoscopic image display apparatus according to claim 10, wherein the first image display device and the second image display device are arranged such that, when the first image and the second image displayed are transmitted through or reflected by the half mirror to be composed, an order and positions of colors of sub-pixels are the same.

13. The stereoscopic image display apparatus according to claim 2, wherein the first image display device and the second image display device are arranged such that, when the first image and the second image displayed are transmitted through or reflected by the half mirror to be composed, an order and positions of colors of sub-pixels are the same.

14. The stereoscopic image display apparatus according to claim 1, wherein the half mirror has a half mirror mounting mechanism which can be attached in whichever of a vertical posture or a horizontal posture.

15. The stereoscopic image display apparatus according to claim 14, wherein the half mirror is square.

16. The stereoscopic image display apparatus according to claim 15, wherein the first image display device and the second image display device are arranged such that, when the first image and the second image displayed are transmitted through or reflected by the half mirror to be composed, an order and positions of colors of sub-pixels are the same.

17. The stereoscopic image display apparatus according to claim 14, wherein the first image display device and the second image display device are arranged such that, when the first image and the second image displayed are transmitted through or reflected by the half mirror to be composed, an order and positions of colors of sub-pixels are the same.

18. The stereoscopic image display apparatus according to claim 1, wherein the first image display device and the second image display device are arranged such that, when the first image and the second image displayed are transmitted through or reflected by the half mirror to be composed, an order and positions of colors of sub-pixels are the same.

19. The stereoscopic image display apparatus according to claim 18, comprising a vertical image reversing unit for carrying out a process for vertically reversing the image displayed on the second image display device.

20. The stereoscopic image display apparatus according to claim 1, wherein the half mirror layer is arranged to have a transmittance and a reflectance based on a transmittance and a reflectance of the half mirror layer determined so that a transmittance when light is transmitted through the polarized light rotating layer and the half mirror layer be equal to the reflectance of the half mirror layer.

* * * * *